US011970411B1

(12) United States Patent
Zeiher et al.

(10) Patent No.: US 11,970,411 B1
(45) Date of Patent: *Apr. 30, 2024

(54) USE OF HOLLOW FIBER FILTRATION IN CONJUNCTION WITH PRECIPITANT TECHNOLOGIES TO RECLAIM WATER FROM COMPLEX AQUEOUS WASTE STREAMS

(71) Applicant: Garratt-Callahan Company, Burlingame, CA (US)

(72) Inventors: E. H. Kelle Zeiher, Hixson, TN (US); Henri Robert Asbell, Burlingame, CA (US); James E Gamlen, Burlingame, CA (US); Daron Gareth Evans, Woodside, CA (US)

(73) Assignee: GARRATT-CALLAHAN COMPANY, Burlingame, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,821

(22) Filed: Dec. 20, 2021

Related U.S. Application Data

(63) Continuation of application No. 16/539,951, filed on Aug. 13, 2019, now Pat. No. 11,203,536.

(60) Provisional application No. 62/718,305, filed on Aug. 13, 2018.

(51) Int. Cl.
| | | |
|---|---|---|
| C02F 1/44 | (2023.01) | |
| B01D 61/18 | (2006.01) | |
| B01D 63/02 | (2006.01) | |
| B01D 65/02 | (2006.01) | |

(Continued)

(52) U.S. Cl.
CPC .............. *C02F 1/444* (2013.01); *B01D 61/18* (2013.01); *B01D 63/02* (2013.01); *B01D 65/02* (2013.01); *C02F 1/004* (2013.01); *C02F 1/5236* (2013.01); *B01D 2311/02* (2013.01); *B01D 2311/12* (2013.01); *B01D 2311/2642* (2013.01); *B01D 2311/2649* (2013.01); *B01D 2321/02* (2013.01); *C02F 2001/007* (2013.01); *C02F 2303/16* (2013.01)

(58) Field of Classification Search
None
See application file for complete search history.

(56) References Cited

U.S. PATENT DOCUMENTS

| | | |
|---|---|---|
| 5,059,317 A | 10/1991 | Marius et al. |
| 5,256,303 A | 10/1993 | Zeiher et al. |
| 5,356,651 A | 10/1994 | Degen et al. |

(Continued)

OTHER PUBLICATIONS

Survey of High Recovery and Zero Liquid Discharge Technologies for Water Utilities, The WateReuse Foundation Michael Mickley P.E. Ph.D. Mickley and Associates, Published by the WateReuse Foundation, 2008, Alexandria, VA.

(Continued)

*Primary Examiner* — Chester T Barry
(74) *Attorney, Agent, or Firm* — Venjuris PC

(57) ABSTRACT

A method of treating aqueous, preferably concentrated, waste streams with a unique combination of steps in a way that is easily scalable and able to be used with batch or continuous flows. The method comprises at least the following steps: Adding at least one precipitating agent to the waste water to produce precipitated solids; and removing the precipitated solids from the waste water using a forward flushable membrane to remove the precipitate solids.

18 Claims, 7 Drawing Sheets

(51) Int. Cl.
*C02F 1/00* (2023.01)
*C02F 1/52* (2023.01)

(56) References Cited

U.S. PATENT DOCUMENTS

| | | | |
|---|---|---|---|
| 5,358,640 | A | 10/1994 | Zeiher et al. |
| 6,017,459 | A | 1/2000 | Zeiher et al. |
| 6,258,277 | B1 | 7/2001 | Salmen et al. |
| 6,699,684 | B2 | 3/2004 | Ho et al. |
| 6,730,227 | B2 | 5/2004 | Zeiher et al. |
| 6,821,428 | B1 | 11/2004 | Zeiher et al. |
| 6,838,001 | B2 | 1/2005 | Zeiher et al. |
| 6,838,002 | B2 | 1/2005 | Zeiher et al. |
| 6,893,568 | B1 * | 5/2005 | Janson ................. B01D 63/026 210/636 |
| 7,048,859 | B1 | 5/2006 | Moffett |
| 7,060,136 | B1 | 6/2006 | Zeiher et al. |
| 7,169,236 | B2 | 1/2007 | Zeiher et al. |
| 7,662,289 | B2 | 2/2010 | Musale |
| 11,203,536 | B1 * | 12/2021 | Zeiher ..................... C02F 1/444 |
| 2005/0098484 | A1 | 5/2005 | Johannsen |
| 2007/0102339 | A1 * | 5/2007 | Cote ................... B01D 63/046 210/321.89 |
| 2014/0076792 | A1 | 3/2014 | Pierik et al. |
| 2017/0253503 | A1 * | 9/2017 | Mehta ................... C02F 1/5245 |
| 2019/0015786 | A1 * | 1/2019 | Shimura .................. C02F 1/44 |
| 2019/0218121 | A1 | 7/2019 | Buschmann |

OTHER PUBLICATIONS

Comparative Study of Brine Management Technologies for Desalination Plants, Dept. of Chemical and Environmental Engineering, University of Seville, Spain. Jose Morillo et al., Desalination 336 (2104) pp. 32-49.

RO Brine Recovery-Total Hardness Balance (typical) schematic. Application Bulletin by Duraflow. www.duraflow.biz.

Drinking Water Treat-ability Database. Precipitative Softening. Environmental Protection Agency (EPA). file://Volumes/GoogleDrive/My%20Drive/!Patent%20FILE/Precipitative%20Softening,%20Water%20Treatability%20Database%20_%20US%20EPA.htm.

Chemical Precipitation: Water Softening. Dipa Dey, et al., Dept. of Civil and Environmental Engineering, Michigan State University, 2007, East Lansing.

Lime Softening. Mohammed Toghraei. P. Eng. Engrowth Training Inc. 2013. www.engedu.ca.

* cited by examiner

USE OF HOLLOW FIBER FILTRATION IN CONJUNCTION WITH PRECIPITANT TECHNOLOGIES TO RECLAIM WATER FROM COMPLEX AQUEOUS WASTE STREAMS

This Application claim the benefit of U.S. Provisional Patent Application No. 62/718,305 having a filing date of Aug. 13, 2018 which is incorporated by reference in its entirety as if fully set forth herein, and is a continuation of U.S. patent application Ser. No. 16/593,951, now U.S. Pat. No. 11,203,536, which is incorporated by reference in its entirety as if fully set forth herein.

BACKGROUND

Waste water streams often contain high amounts of dissolved solids. Removal of the solids and reclamation/recycle of the water is currently costly, involving high capital and operating expenses affordable only to the largest users. The invention describes a method of treating the waste to reclaim water and minimize liquid discharge that is (a) affordable and practical for small scale users and (b) scalable to accommodate larger scale users.

Prior methods of minimizing liquid discharge include the use of crystallizers, centrifuges, high recovery RO, sludge dewatering and precipitation techniques, once-through microfiltration, evaporation and combinations of these techniques.

Most techniques are expensive and poorly suited to volumes of less than approximately 1 MGD.

Industrial water processes are often limited in how high they can concentrate aqueous streams due to the presence of scaling salts in the streams of interest. As water reuse becomes more prevalent, disposal of these salt and particulate laden streams is under increasing legislative and other pressures. Achieving true "zero liquid discharge" (ZLD) requires both high up-front investment costs (CAPEX) and high on-going operational costs (OPEX) and is beyond the capability of small and medium sized companies.

While ZLD is impractical for most companies, Minimal Liquid Discharge (MLD) can be achieved. This invention describes a cost-effective, affordable process for companies to reuse water and achieve effective MLD.

Types of water to treat for MLD include but are not limited to:

a. Cooling tower blow down water reclaim
b. Reverse osmosis (RO) reject water reclaim
c. Softener backwash water reclaim (ion exchange softening)
d. Treated wastewater reclaim
e. Boiler blow down water reclaim
f. Process water reclaim
g. Storm runoff reclaim
h. Spent brines from other processes
i. Spent scrubber waters As an example, comparison of the present invention vs. competing technologies are shown in Tables 1 and 2. Costs estimated and/or extrapolated from current literature, where available.

TABLE 1

Competing Technology Attributes vs. Current Invention

| Competing Technology | Estimated Treatment Costs, USD (per 100,000 GPD) | Discussion and Comparison vs. Current Invention |
| --- | --- | --- |
| Mechanical evaporation (Distillation) | CAPEX 1,140,625 OPEX 191,250/yr | Usually combined with crystallizer |
| Crystallizer | CAPEX 225,000 OPEX 76,875/yr | Usually combined with evaporation Requires 250-300 kWh per 1000 gal |
| VMD (Vacuum memb. distill) MSF (multi stage flash) MED (multi effect distillation) VC (vapor compression) | OPEX range 38,800,000 to 122,000,000 | |
| Drum Dryer | CAPEX 20,833,333 | |
| EFC (Eutectic freeze crystallization) | CAPEX 2,327,236 OPEX 281,415/yr | Costs much lower than distillations |
| VSEP (Vibratory Shear-Enhanced Process) | CAPEX $1,304,375 OPEX 174,375/yr | |
| Enhanced Membrane System | CAPEX 3,500,000 OPEX 191,250/yr | Includes HERO and similar. |
| Evaporation pond/Solar evap. | CAPEX 5,978,750 OPEX 153,750 yr | |
| Constructed wetlands | CAPEX 6,016,250 OPEX 293,125/yr | |
| Waste water effluent mixing | Minimal | May be regulated locally |
| EDR (electrodialaysis reversal) | CAPEX 300-800 per cell OPEX 31,755-117,530/yr | Cost estimates for a 1000 ppm TDS solution only. Costs rise as TDS rises. |
| Forward Osmosis | 30-50% less energy vs. evaporators | |
| INVENTION | CAPEX = 27,000 OPEX = 12,846 to 50,691/yr | Scalable for small volumes. Small footprint. Robust. Inexpensive. |

TABLE 2

Relative Footprint and Size of Small Volume Units

| | Technology | Flow** | Footprint |
| --- | --- | --- | --- |
| Competing Technologies | Crystallizer | 70 gpm | 648" × 288" (L × W) |
| | VSEP | 220 gpm | 204" × 57" × 194" (L × W × H) |
| | Vacuum Distillation | 1.7 gpm | 118" × 90" × 110" (L × WH) |
| | EDI | 280 gpm | 90" × 309" (L × W) |
| | Drum dryer | 55 gallon, batch | 66" × 62" × 103" (L × W × H) |
| Invention | Traditional Cartridge Filter (Bank) | 150 gpm | 13" × 13" × 56" (L × W × H) |
| | Traditional Cartridge Filter (Single) | 3 gpm | 7.4" × 4.6" (L × W) |

**Smallest commercially available size chosen (where possible)

Settling Period

The following background patents, which are incorporated by reference in their entireties, are disclosed merely for background purposes and relevant to the state of the art, but do not contain one or more of the elements of the present invention:
 a. U.S. Pat. No. 7,662,289 Method of cleaning fouled or scaled membranes
 b. U.S. Pat. No. 7,169,236 Method of monitoring membrane cleaning processes
 c. U.S. Pat. No. 7,060,136 Method of monitoring membrane cleaning processes
 d. U.S. Pat. No. 6,838,002 Method of monitoring membrane separation processes
 e. U.S. Pat. No. 6,838,001 Method of monitoring membrane separation processes
 f. U.S. Pat. No. 6,821,428 Method of monitoring membrane separation processes
 g. U.S. Pat. No. 6,730,227 Method of monitoring membrane separation processes
 h. U.S. Pat. No. 6,699,684 Method of monitoring biofouling in membrane separation systems
 i. 6,017,459 Apparatus and method for the monitoring of membrane deposition
 j. U.S. Pat. No. 5,358,640 Method for inhibiting scale formation and/or dispersing iron in reverse osmosis systems
 k. U.S. Pat. No. 5,256,303 Method for inhibiting scale formation and/or dispersing iron in reverse osmosis systems The following background patent, which is incorporated by reference in its entirety, is relevant to the state of the art, but does not contain one or more of the elements of the present invention:
 U.S. Pat. No. 6,258,277: Composition and method for simultaneously precipitating metal ions from semiconductor wastewater and enhancing microfilter operation.

Additional Reviews of technology and costs, which are incorporated herein by reference, through Provisional Patent Application No. 62/718,305 to which this application claims the benefit of, in their entireties as if fully set forth herein, are relevant to the state of the art, but do not contain one or more of the elements of the present invention, and can be found in the following references:
 Survey of High-Recovery and Zero Liquid Discharge Technologies for Water Utilities.
 Comparative Study Of Brine Management Technologies For Desalination Plants. Brine Recovery—Total Hardness Balance (Typical) schematic.
 Drinking Water Treatability Database
 Chemical Precipitation: Water Softening.
 Lime Softening.

SUMMARY

The structure, overall operation and technical characteristics of the present invention will become apparent with the detailed description of preferred embodiments and the illustration of the related drawings herein.

Preferably, the invention consists of a method of treating aqueous, preferably concentrated, waste streams with a unique combination of steps in a way that is easily scalable and able to be used with continuous flow of small volumes [such as 1-100 gallons per minute (gpm); more preferably 10-50 gpm] as well as with large volumes of up to 10 mgd or larger.

Preferably, the process can be used in both batch and continuous modes to further tailor the system. Batch processing would allow for processing of extremely small or intermittently collected volumes<<1 gpm.

Preferably, the process reduces both CAPEX and OPEX compared to traditional methods.

Preferably, the process has specific advantages compared to other membrane processes. Preferably, the invention is unique in that it is flushable, can be fully automated and utilizes the unique surface properties of a hollow fiber membrane filter.

Preferably, portions of the invention can be placed inside traditional cartridge filter housings, eliminating the need for extra pumping or the expense of an independent microfilter unit.

Preferably, the described invention can filter down to 0.005 microns, vs. traditional microfiltration, which is typically limited to a 0.1 micron pore size.

Preferably, the invention can be used on small volumes, (as low as 1-10 gpd in batch mode) and does not require a large footprint.

Preferably, the invention does not require a second RO to process the wastewaters (vs. existing process; for example, see FIG. 1).

Preferably, the invention has specific advantages compared to precipitation methods. Unlike traditional precipitation methods, the invention preferably is not limited by the need for gravity settling of precipitated solids or complex design of precipitation vessels.

Preferably, the invention is not limited by pressure or temperature, overcoming the limitations of cold, warm and hot lime softening.

Preferably, the invention does not require extended times to build particle size.

Preferably, the invention is designed to respond quickly to process upsets.

Preferably, the invention does not require specific reaction zones in the precipitation step.

Preferably, the invention significantly reduces the size of the precipitation step, even to the point of eliminating the holding tank in some cases.

Preferably, the invention increases the recovery of useful by-products in wastewater that are usually disposed of during discharge: TSS, BOD, COD, FOG, etc.

One preferred embodiment of the invention is a method to reclaim water from a waste water with dissolved solids comprising the following steps: adding at least one precipitating agent to the waste water to produce precipitated solids; and removing the precipitated solids from the waste water using a forward flushable membrane to remove the precipitate solids.

Preferably, the method to reclaim water may further comprise the step of adding a floc building aid to the waste water with precipitated solids before the step of removing the precipitating solids.

Preferably, the step of adding a floc building aid to the waste water with precipitated solids includes adding the floc building aid to an amount between 5 and 30 parts per million. More preferably, the step of adding a floc building aid to the waste water with precipitated solids includes adding the floc building aid to an amount between 10 and 20 parts per million.

Even more preferably, the method to reclaim water may further comprise the step of sequentially filtering the waste water with precipitated solids using a mesh wire screen of at least 74 microns, a 5 micron cartridge filter, and a 1 micron cartridge filter before the step of removing the precipitating solids.

Preferably, the method to reclaim water may further comprise the step of settling the waste water with precipitated solids for a period of time that is preferably at least 5 min and more preferably less than 30 minutes before the step of removing the precipitating solids.

In another preferred embodiment, the step of adding at least one precipitating agent to the waste water to produce precipitated solids, includes the at least one precipitating agent having a range of $0.005 \times 10^{-3}$ to $0.10 \times 10^{-3}$ (milliequivalents/Liter/ppm hardness) selected to produce precipitated lime solid. More preferably, the step of adding at least one precipitating agent to the waste water to produce precipitated solids, includes the at least one precipitating agent having a range of $0.01 \times 10^{-3}$ to $0.04 \times 10^{-3}$ (milliequivalents/Liter/ppm hardness) selected to produce precipitated lime solid. Most preferably, the step of adding at least one precipitating agent to the waste water to produce precipitated solids, includes the at least one precipitating agent having a range of $0.0140 \times 10^{-3}$ to $0.0250 \times 10^{-3}$ (milliequivalents/Liter/ppm hardness) selected to produce precipitated lime solid.

In yet another preferred embodiment, the step of adding at least one precipitating agent to the waste water to produce precipitated solids, includes the at least one precipitating agent having a range of $0.0025 \times 10^{-3}$ to $0.037 \times 10^{-3}$ (milliequivalents/Liter/ppm hardness) selected to produce precipitated soda ash solid. More preferably, the step of adding at least one precipitating agent to the waste water to produce precipitated solids, includes the at least one precipitating agent having a range of $0.0046 \times 10^{-3}$ to $0.0184 \times 10^{-3}$ (milliequivalents/Liter/ppm hardness) selected to produce precipitated soda ash solid. Most preferably, the step of adding at least one precipitating agent to the waste water to produce precipitated solids, includes the at least one precipitating agent having a range of $0.00730 \times 10^{-3}$ to $0.0115 \times 10^{-3}$ (milliequivalents/Liter/ppm hardness) selected to produce precipitated soda ash solid.

Preferably, the step of adding at least one precipitating agent to the waste water to produce precipitated solids, includes the at least one precipitating agent selected to produce precipitated solids from the group consisting of lime solid, soda ash solid and combinations thereof In a preferred embodiment, the step of removing the precipitated solids from the waste water using a forward flushable membrane to remove the precipitate solids includes the forward flushable membrane by hollow fiber filtration.

DESCRIPTION OF THE EMBODIMENTS

Figure 1:
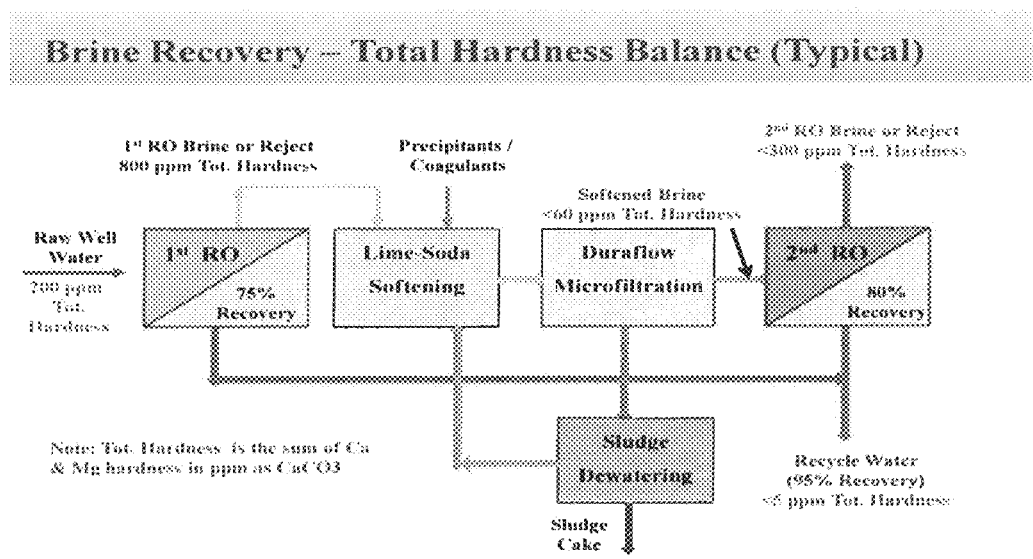
FIG. 1 is a block diagram of a prior art example an enhanced membrane system.
Figure 2:
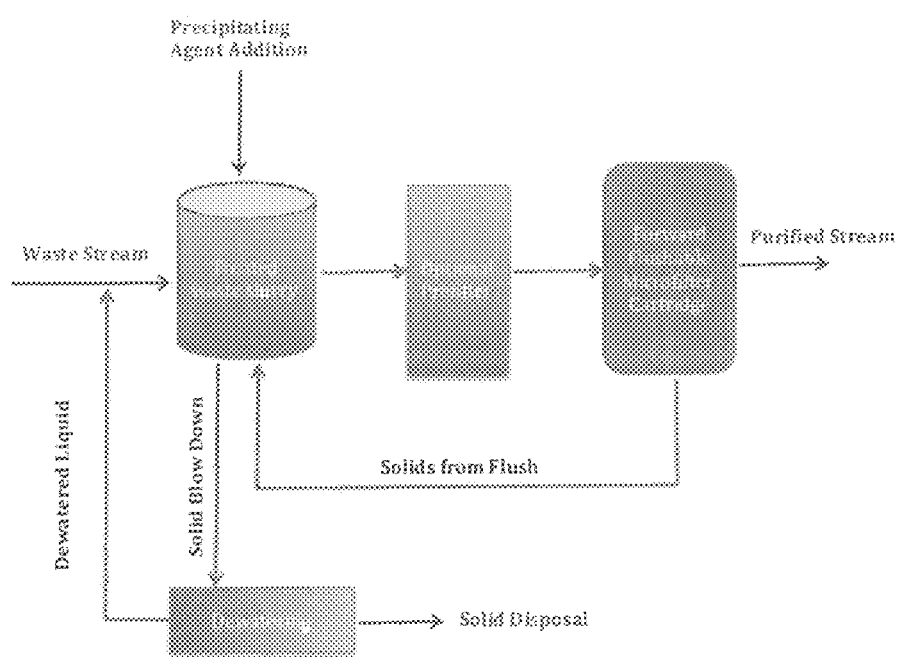
FIG. 2 is a process flow diagram of one preferred embodiment.
Figure 3:
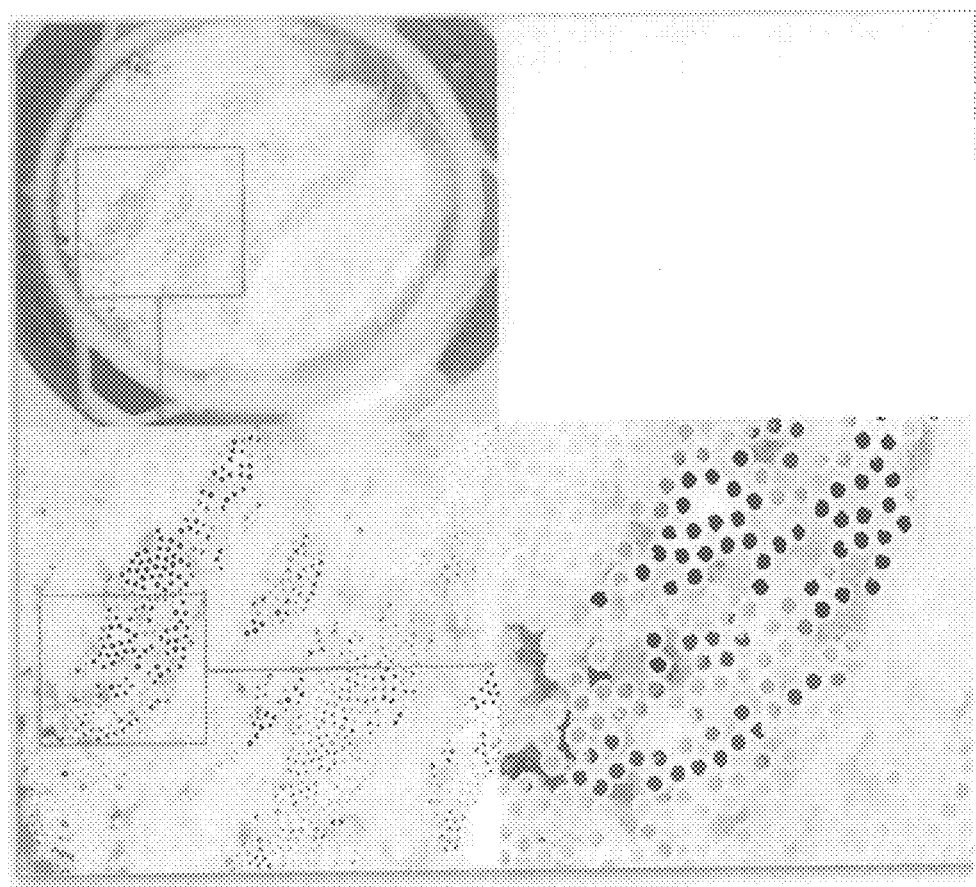
FIG. 3 is a picture of flow channels of a preferred embodiment of a forward flushable membrane for filtering comprising 3 increasing magnifications of a lumen having an inner diameter of 200 microns. Preferably, the lumen diameter is greater than 100 microns and less than 400 microns; additionally the pore size for permeate flow is greater than 2 nanometers and less than 200 nanometers.
Figure 4:
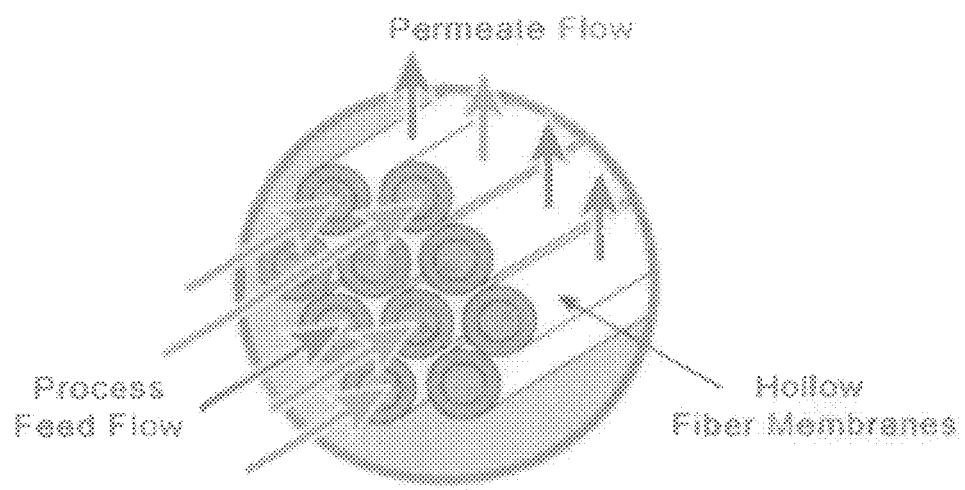
FIG. 4 is a diagrammatic representation of a preferred embodiment of a forward flushable membrane for filtering showing flow.
Figure 5:
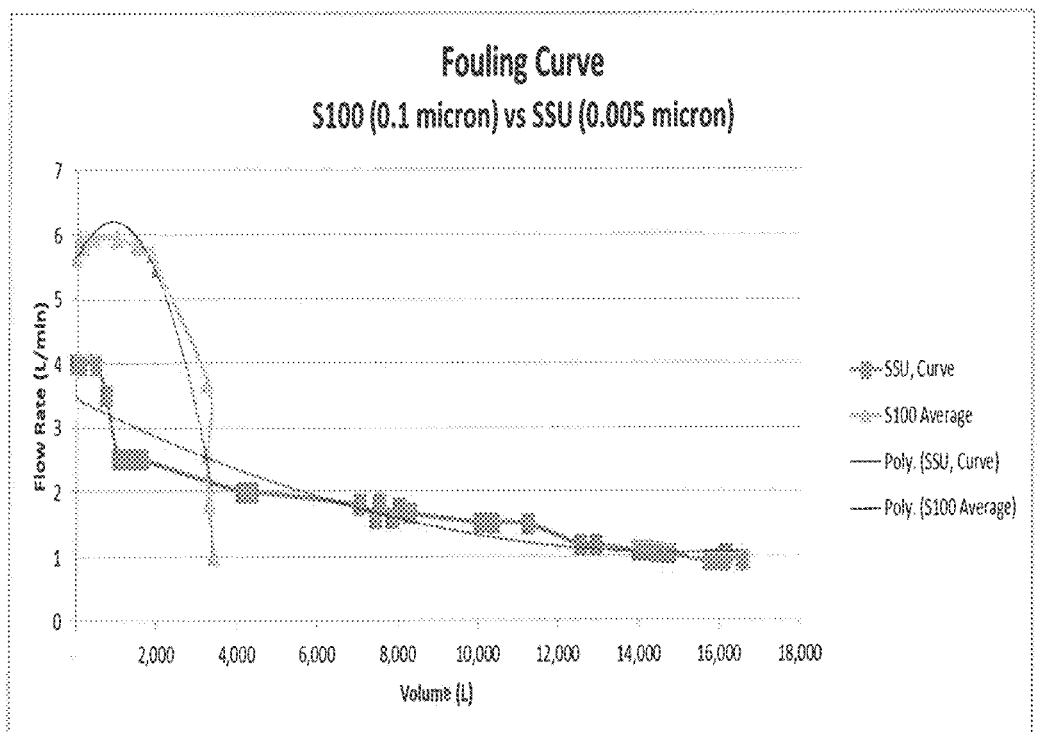
FIG. 5 is a graph of a fouling curve showing flow rate versus volume of a preferred embodiment of a forward flushable membrane and a forward flushable membrane with a larger pore size.
Figure 6:
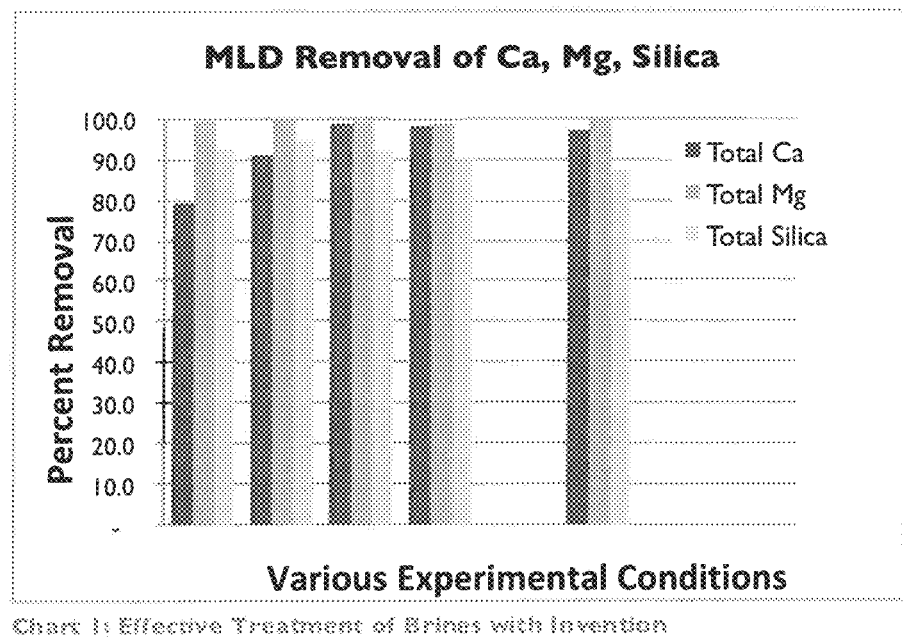
FIG. 6 is a bar chart showing the removal of Ca, Mg, and silica for various experimental conditions. Experimental conditions include adding various amounts of lime, soda ash and caustic to stirred wastewater solutions. Waste solutions consisted of 500 mL aliquots of either lab-made waste or one of two customer wastes containing hardness, silica and metal ions. Treatments were added as slurries of product in about 5 to about 25 mL aliquots to stirred solutions of waste. Water was allowed to settle and supernate was filtered through a 0.22 micron syringe filter before being analyzed according to standard methods.
Figure 7:
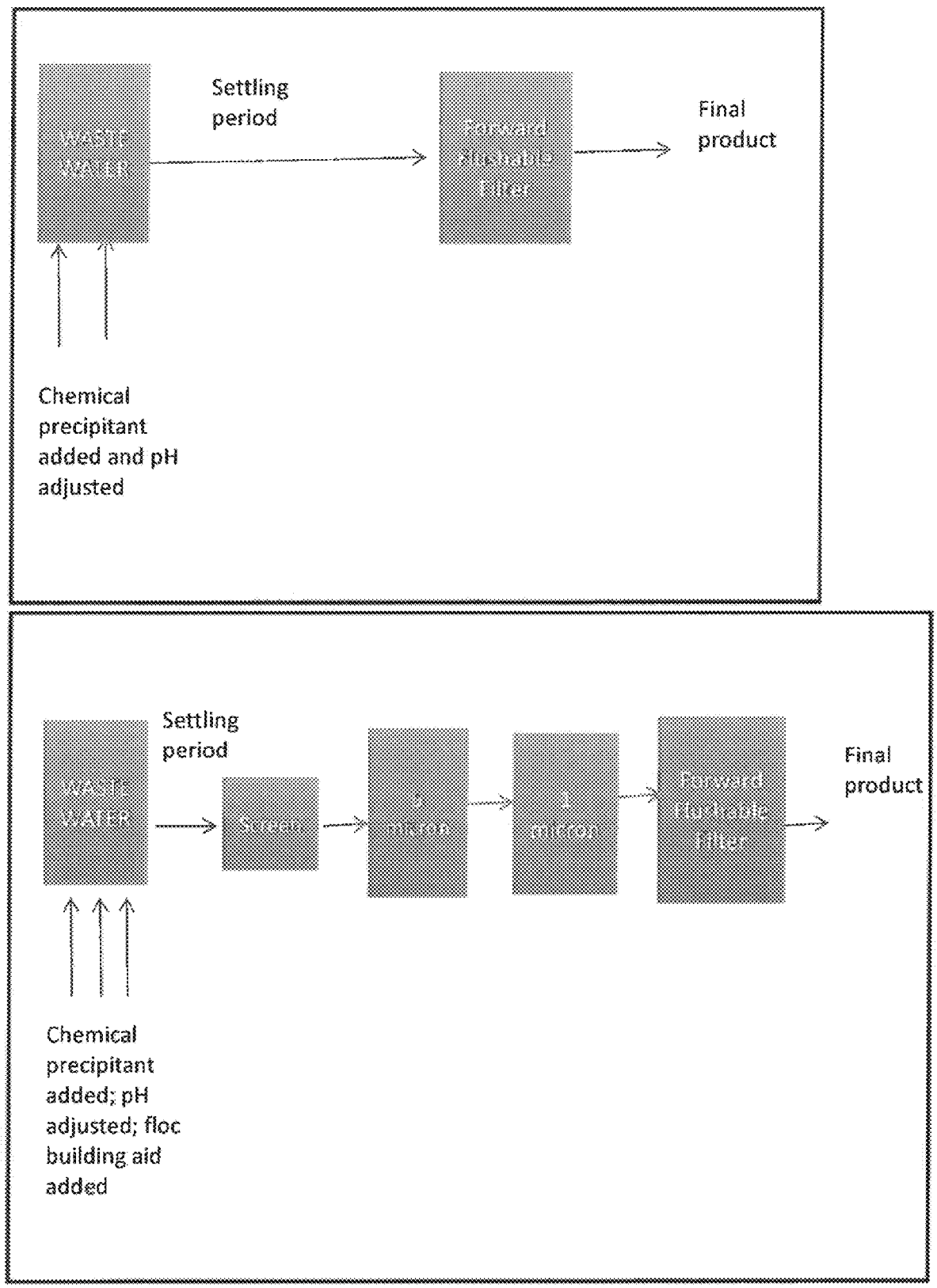
FIG. 7 is a process flow diagram of another preferred embodiment.

A preferred embodiment of the invention is where Process waters, which have been concentrated to the maximum desirable concentration by traditional means (e.g. RO), are collected and forced to quickly precipitate dissolved ions and/or small suspended solids via electrostatic precipitation methods or by the addition of precipitating and/or coagulating agents such as chelants, lime, slaked lime, dolomitic lime, cold lime softening agents, lime-soda softening agents, warm lime softening agents, warm lime-soda softening agents, hot lime softening agents, hot lime-soda softening agents, caustic softening agents, polymeric chemical precipitants, coagulants, flocculants, and sludge conditioners, silica precipitants and co-precipitants, metal salts such as aluminum, iron and the like, pH adjustment by addition of soda ash, caustic, alkalinity sources, acid sources and the like, or other means as appropriate to the individual water stream.

Preferably, precipitating agents include but are not limited to the following:

Dry and liquid (solution or emulsion) polymers such as but not limited to: cationic, polyacrylamide copolymers; cationic, polyacrylamide homopolymers; cationic, polyacrylamide copolymer emulsions; cationic, polyacrylamide homopolymer emulsions; anionic, polyacrylamide copolymers; anionic, polyacrylamide copolymer emulsions; linear polyamine coagulants; branched polyamine coagulants; polyDADMAC coagulants; melamine-formaldehyde colloids; non-ionic, polyacrylamide homopolymers; nonionic, polyacrylamide homopolymer emulsions; and other similar materials.

Inorganic coagulants and blends, such as but not limited to:

ferric chloride; ferric chloride blends with polyamine; aluminum chloride; aluminum chloride blends with polyamines; aluminum chloride blends with polyDADMACs; polyaluminum chloride; polyaluminum chloride blends with polyamines; polyaluminum chloride blends with polyDADMACs; polyaluminum sulfosilicates; polyaluminum chlorosulfates; sodium aluminate; ferric chloride/aluminum chloride blends; ferrous sulfates; ferric sulfates; calcium chlorides; cerium chlorides; aluminum chlorohydrate; aluminum chlorohydrate blends with polyamines; aluminum chlorohydrate blends polyDADMACs; aluminum sulfate; aluminum sulfate blends with polyamines; aluminum sulfate blends polyDADMACs; activated silica; quicklime; hydrated lime; dolomitic lime; magnesium hydroxide; chitosan and its derivatives; aminoethylated tannin coagulants; polyethylene oxides and their derivatives; polyethyleneimines and their derivatives; polyferric sulfates; organoclays; bentonite clays; and other similar materials.

This treatment may be in-line or, alternately, use a collection tank may be used. Exact configuration will depend on the volume of waste stream to be processed, required time to process, available footprint and other factors.

Process additives may be added using dissolvable bags to allow a "one pot" reaction vessel in certain cases. In cases where larger volumes of added reactants are needed, the addition could be accomplished by preparing the chemical additives in a secondary tank and adding the resulting solution in a manner proportional to the flow of the incoming water.

The resulting slurry, consisting of precipitated solids, is pushed through a hollow polysulfone fiber ultrafilter with pore sizes between 0.002 and 0.010 microns. An optional pre-filtration step, such as micron sized cartridge filtration and/or filtration through fine mesh screens may be used to remove large size slurry solids and extend the life of the hollow polysulfone fiber ultrafilter.

Slurry solids are retained within the inner lumen of the hollow fiber, while purified water is pushed through the lumen to the outside of the hollow fiber. The sample may be collected or alternately sent through a second stage of the hollow fiber filter. Purified water is collected and returned to the head of the plant for further use. Such water is suitable, for example, as RO feedwater.

Slurry solids are retained within the inner lumen of the hollow fiber filter until a system flush is initiated. This flush may be manually triggered, triggered via a timer, or, alternatively, it may be set to occur based on the Delta P across the filter or another metric such as time. Once triggered, a short (between 3 and 60 second) flush removes slurry solid retains from the inner lumen and sends it back to the slurry tank, or a separate collection tank for subsequent removal and processing. In this way the filter is kept clean.

Periodically, the slurry tank is "blown down" and slurry solids are removed. These solids may be further treated with traditional liquid-solid separation techniques such as filter presses, etc. to dewater the sludge and produce a filter cake that passes the Paint Filter test and is suitable for off-site disposal. The liquid portion from the dewatering step is returned to the slurry tank.

In a modification of the above, a prototype invention, which includes removing the precipitated solids via a drainable basket-type filter is envisioned. This variation includes the ability to prefilter particles prior to entering the hollow fiber filter to help extend the life of the hollow fiber filter.

Chemical precipitant added and pH adjusted.

The invention may also be used without the additional precipitation step and additives in certain cases.

Preferably, the technique is useful for reducing volumes of RO ("reverse osmosis") brine, softener regeneration brine, cooling tower blow down, boiler blow down, wastewater blow down and other similar streams.

Preferably, the invention has a small footprint and can be scaled to accommodate various size waste streams from small batch to large GPM flow through systems. More preferably, the smallest size currently envisioned is a 2'×3' cart.

Preferably, the water slurry is directed into inner lumen of the hollow fiber membrane.

Preferably, hollow fiber membrane material having small flow channels in the nanometer range is composed of a common polymer material, such as polysulfone or polyethersulfone. As a preferred example, the S100 filter contains 0.1 micron hollow fiber membrane, and the SSU filter contains 0.005 micron hollow fiber membrane. The S100 filter fouls to cessation of flow much faster, and under a different curve than the SSU filter. The SSU filter fouls more quickly to the ~60% capacity level, but then filters 3 to 5 times more volume before fouling, as compared to the S100 filter. The curves obviously change based on the particulate size bell curve of the incoming water, but essentially the theory is that the smaller pores have a lower probability of being permanently blocked with a particle lodged inside the nanometer-sized flow channels.

In a preferred example, the following experimental results are shown as a proof of concept. The basic experimental steps included (a) dosing 500 ml aliquots of waste water with a combination of precipitating agents, (b) adjusting pH, (c) stirring on a gang stirring device for various times and (d) analyzing the supernatant fluid after passing it through a 0.22 micron syringe filter. Samples were analyzed before and after passing the treated waste through a benchtop size forward flushable filter prior to analyzing.

Preferably, one embodiment of the process includes:
  Adding water containing dissolved solids. Specifically dissolved Ca, Mg, Si, Hardness, metals and the like.
  Adding a precipitating agent/agents in specific ratios
  Using a forward flushable ultrafiltration membrane to remove the precipitated solids.

This embodiment of the process is greatly improved by adding the following between the reaction tank and the forward flushable filter to protect the forward flushable filter:
  Adding a floc building aid
  Sequential filtration through screens and cartridge/depth filters
    Mesh screen basket sized to be ideally between 74 and 149 micron wire screen. (Note this is surprising because it is not the same as one expects from micron rated cartridge filters!). <74 micron wire screen will not pass normal water (unexpected)
    5 micron cartridge filter
    1 micron cartridge filter Additional features which could be added to this embodiment of the process include:
  physical baffles and/or mechanical settling aids (this is especially needed for continuous operation but not necessary for batch operation)
  physical scraping devices to keep screens clear
  post-process pH adjustment to meet customer specifications
  monitoring components including, but not limited to:
    flow switches to control incoming water flow rates (preferably slaved to treatment addition pumps to control treatment feeds)
    pH meters to monitor and control process (caustic feed regulator)
    multiple treatment tanks to allow semi-continuous operation and switches to select between tanks
    additional monitoring and/or physical modifications to the basic unit to allow continuous operation
    monitoring such as total dissolved solids (TDS), turbidity, or ion-specific electrodes to detect breakthrough of solids and signal the need to perform maintenance on the process/equipment.
    differential pressure monitoring of individual filtration components to signal the need to change out filters
    timers to start/stop batch processes (based on settling times)

This embodiment of the process surprisingly found settling of precipitated sludge can result in either cloudy or crystal clear supernatant solutions. The crystal clear supernatant solutions were a surprising result. Factors which appear to contribute to clarity include:

- age of sludge blanket In process (older sludge is more likely to form clear supernatant)
- dosage of components. While the system is robust and can operate with a range of component dosages, the more closely matched the dose is to the stoichiometric requirement for precipitation, the more clear the supernatant.

Additionally, other surprises include:

- age of floc building aid does not impact process significantly. Specifically, dilutions of polymers greater than 1 month old perform as well a fresh dilutions
- Stabilized precipitating lime slurries (which easily remain in suspension) allow much more effective and rapid settling than non-stabilized versions.
- Stagnant beds work as well as stirred/fluidized beds
- Final remaining hardness and/or metals consistently below levels predicted based on "simple" lime-soda softening processes. See examples below: The table below converts the cold lime softening from typical softener effluent analysis (see below table 7-1) to a percentage removal and compares removal results to the invention result.

TABLE 3

Comparison of current technology with Invention

| | Ca hardness | Mg hardness | Total hardness |
|---|---|---|---|
| Typical Cold Lime Softening Removal | 76% | 54% | 67% |
| Typical Invention Hardness Removal | 99% | 99% | 99% |

TABLE 7-1

Typical softener effluent analyses.

| | Raw Water | Removal of Calcium Alkalinity Cold-Lime | Lime-soda Softening (Cold) | Lime-soda Softening (Hot) | Lime Softening (Hot) |
|---|---|---|---|---|---|
| Total Hardness (as $CaCO_3$), ppm | 250 | 145 | 81 | 20 | 120 |
| Calcium Hardness (as $CaCO_3$), ppm | 150 | 85 | 35 | 15 | 115 |
| Magnesium Hardness (as $CaCO_3$), ppm | 100 | 60 | 46 | 5 | 5 |
| "P" Alkalinity (as $CaCO_3$), ppm | 0 | 27 | 37 | 23 | 18 |
| "M" Alkalinity (as $CaCO_3$), ppm | 150 | 44 | 55 | 40 | 28 |
| Silica (as $SiO_2$), ppm | 20 | 19 | 18 | 1-2 | 1-2 |
| pH | 7.5 | 10.3 | 10.6 | 10.5 | 10.4 |

See typical Lime-Soda Softening (reference: https://www.suezwatertechnologies.com/handbook/chapter-07-precipitation-softening)

What is claimed:

1. A method to reclaim water from a waste water with dissolved solids comprising the following steps:
   Adding at least one precipitating agent to the waste water to produce precipitated solids;
   and removing the precipitated solids from the waste water using a hollow fiber membrane to remove the precipitated solids,
   wherein the step of:
   Adding at least one precipitating agent to the waste water to produce precipitated solids, includes the at least one precipitating agent having a range of $0.005 \times 10^{-3}$ to $0.10 \times 10^{-3}$ (milliequivalents/Liter/ppm hardness) selected to produce precipitated lime solid.

2. The method to reclaim water of claim 1,
   wherein the step of:
   Adding at least one precipitating agent to the waste water to produce precipitated solids, includes the at least one precipitating agent having the range of $0.01 \times 10^{-3}$ to $0.04 \times 10^{-3}$ (milliequivalents/Liter/ppm hardness) selected to produce precipitated lime solid.

3. The method to reclaim water of claim 1,
   wherein the step of:
   Adding at least one precipitating agent to the waste water to produce precipitated solids, includes the at least one precipitating agent having the range of $0.0140 \times 10^{-3}$ to $0.0250 \times 10^{-3}$ (milliequivalents/Liter/ppm hardness) selected to produce precipitated lime solid.

4. A method to reclaim water from a waste water with dissolved solids comprising the following steps:
   Adding at least one precipitating agent to the waste water to produce precipitated solids;
   and removing the precipitated solids from the waste water using a hollow fiber membrane to remove the precipitated solids,
   Adding at least one precipitating agent to the waste water to produce precipitated solids, includes the at least one precipitating agent having a range of $0.0025 \times 10^{-3}$ to $0.037 \times 10^{-3}$ (milliequivalents/Liter/ppm hardness) selected to produce precipitated soda ash solid.

5. The method to reclaim water of claim 4,
   wherein the step of:
   Adding at least one precipitating agent to the waste water to produce precipitated solids, includes the at least one precipitating agent having the range of $0.0046 \times 10^{-3}$ to $0.0184 \times 10^{-3}$ (milliequivalents/Liter/ppm hardness) selected to produce precipitated soda ash solid.

6. The method to reclaim water of claim 4,
   wherein the step of:
   Adding at least one precipitating agent to the waste water to produce precipitated solids, includes the at least one precipitating agent having the range of $0.00730 \times 10^{-3}$ to $0.0115 \times 10^{-3}$ (milliequivalents/Liter/ppm hardness) selected to produce precipitated soda ash solid.

7. A method to reclaim water from a waste water with dissolved solids comprising the following steps:
   Adding at least one precipitating agent to the waste water to produce precipitated solids;
   and removing the precipitated solids from the waste water using a hollow fiber membrane to remove the precipitate solids,
   wherein the step of:
   Adding at least one precipitating agent to the waste water to produce precipitated solids, includes the at least one precipitating agent selected to produce precipitated solids from the group consisting of lime solid, soda ash solid and combinations thereof.

8. The method to reclaim water of claim 7, wherein the step of:

Adding at least one precipitating agent to the waste water to produce precipitated solids, includes the at least one precipitating agent having a range of $0.0025 \times 10^{-3}$ to $0.037 \times 10^{-3}$ (milliequivalents/Liter/ppm hardness) selected to produce precipitated solids from the group consisting of lime solid, soda ash solid and combinations thereof.

9. The method to reclaim water of claim 7, further comprising the step of:

Adding a floc building aid to the waste water with precipitated solids before the step of removing the precipitating solids.

10. The method to reclaim water of claim 9, further comprising the step of:

Sequentially filtering the waste water with precipitated solids using a mesh wire screen of at least 74 microns, a 5 micron cartridge filter, and a 1 micron cartridge filter before the step of removing the precipitating solids.

11. The method to reclaim water of claim 7, further comprising the step of:

Sequentially filtering the waste water with precipitated solids using a mesh wire screen of at least 74 microns, a 5 micron cartridge filter, and a 1 micron cartridge filter before the step of removing the precipitating solids.

12. The method to reclaim water of claim 7, further comprising the step of:

Settling the waste water with precipitated solids for a period of time before the step of removing the precipitating solids.

13. The method to reclaim water of claim 12, further comprising the step of:

Adding a floc building aid to the waste water with precipitated solids before the step of removing the precipitating solids.

14. The method to reclaim water of claim 13, further comprising the step of:

Sequentially filtering the waste water with precipitated solids using a mesh wire screen of at least 74 microns, a 5 micron cartridge filter, and 1 micron cartridge filter before the step of removing the precipitating solids.

15. The method to reclaim water of claim 12, further comprising the step of:

Sequentially filtering the waster water with precipitated solids using a mesh wire screen of at least 74 microns, a 5 micron cartridge filter, and a 1 micron cartridge filter before the step of removing the precipitating solids.

16. The method to reclaim water of claim 9, wherein the step of:

Adding a floc building aid to the waste water with precipitated solids includes adding the floc building aid to an amount between 1 and 50 parts per million.

17. The method to reclaim water of claim 9, wherein the step of:

Adding a floc building aid to the waste water with precipitated solids includes adding the floc building aid to an amount between 5 and 30 parts per million.

18. The method to reclaim water of claim 9, wherein the step of:

Adding a floc building aid to the waste water with precipitated solids includes adding the floc building aid to an amount between 10 and 20 parts per million.

* * * * *